US008868334B2

(12) United States Patent  
Ando et al.

(10) Patent No.: US 8,868,334 B2  
(45) Date of Patent: Oct. 21, 2014

(54) MOVING BODY POSITION DETECTION SYSTEM, MOVING BODY POSITION DETECTION APPARATUS, MOVING BODY POSITION DETECTION METHOD, AND COMPUTER-READABLE STORAGE MEDIUM

(71) Applicants: Yohei Ando, Okazaki (JP); Takuma Yagi, Sapporo (JP)

(72) Inventors: Yohei Ando, Okazaki (JP); Takuma Yagi, Sapporo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 0 days.

(21) Appl. No.: 13/739,603

(22) Filed: Jan. 11, 2013

(65) Prior Publication Data

US 2013/0245934 A1  Sep. 19, 2013

(30) Foreign Application Priority Data

Mar. 13, 2012 (JP) ................................. 2012-055931

(51) Int. Cl.  
  *G01C 21/12* (2006.01)  
  *G01C 21/16* (2006.01)

(52) U.S. Cl.  
  CPC .............. *G01C 21/12* (2013.01); *G01C 21/165* (2013.01)  
  USPC ..................................... 701/446; 340/995.25

(58) Field of Classification Search  
  CPC ...... G01C 21/165; G01C 21/12; G01C 21/30; G01C 21/32; G01C 21/28; G01C 21/26; G01C 21/06; G01S 19/50; G01S 19/49; G01S 19/47; B60W 40/072; B60W 40/076  
  USPC ......... 701/446, 472, 445, 450, 409, 532, 468, 701/500; 340/995.25, 995.27, 995, 28, 19  
  See application file for complete search history.

(56) References Cited

U.S. PATENT DOCUMENTS

| 5,334,986 | A  | * | 8/1994  | Fernhout ................. 342/357.31 |
| 5,394,333 | A  | * | 2/1995  | Kao ............................. 701/445 |
| 6,766,247 | B2 | * | 7/2004  | Mosis .......................... 701/446 |
| 8,630,461 | B2 | * | 1/2014  | Miyajima et al. ............ 382/104 |
| 2003/0069688 | A1 | * | 4/2003  | Mosis .......................... 701/207 |
| 2004/0044477 | A1 | * | 3/2004  | Jung et al. ....................... 702/5 |
| 2009/0326809 | A1 | * | 12/2009 | Colley et al. ................. 701/208 |
| 2011/0243379 | A1 | * | 10/2011 | Miyajima et al. ............ 382/103 |

FOREIGN PATENT DOCUMENTS

| EP | 0 747 668 A2 | 12/1996 |
| EP | 2 224 209 A2 | 9/2010 |
| JP | 4651511 B2 | 3/2011 |

OTHER PUBLICATIONS

Extended European Search Report, dated Sep. 2, 2014, issued in counterpart European Patent Application No. 13155002.2.

* cited by examiner

Primary Examiner — Marthe Marc-Coleman  
(74) Attorney, Agent, or Firm — Sughrue Mion, PLLC (57) ABSTRACT

A moving body position detection system including a unit that acquires dead reckoning navigation information on a moving body; a unit that identifies a position on the moving body on a link based on the dead reckoning navigation information on the moving body; a unit that acquires current position link data on a current position link and neighboring link data on a neighboring link. The current position link is a link on which the moving body position is located, and the neighboring link is connected to the current position link. The system also includes a unit that compares the dead reckoning navigation information on the moving body with the current position link data and with the neighboring link data; and a unit that updates the position of the moving body based on a comparison result of the comparison unit.

10 Claims, 6 Drawing Sheets

MOVING BODY POSITION DETECTION SYSTEM, MOVING BODY POSITION DETECTION APPARATUS, MOVING BODY POSITION DETECTION METHOD, AND COMPUTER-READABLE STORAGE MEDIUM

INCORPORATION BY REFERENCE

The disclosure of Japanese Patent Application No. 2012-055931 filed on Mar. 13, 2012 including the specification, drawings and abstract is incorporated herein by reference in its entirety.

BACKGROUND OF THE INVENTION

1. Field of the Invention

The invention relates to a moving body position detection system, a moving body position detection apparatus, a moving body position detection method, and a computer-readable storage medium for detecting the position of a moving body.

2. Description of the Related Art

Recently, a navigation device that provides a vehicle with traveling guidance is mounted in many cases in the vehicle to allow a driver to easily arrive at a desired destination. A navigation device uses a GPS receiver to detect the current position of a host vehicle, acquires map data, corresponding to the current position, from a recording medium such as a DVD-ROM or an HDD or from a network, and displays the acquired data on a liquid crystal monitor. In addition, the navigation device has the route search function that searches for an optimal route from the starting point to the destination in response to a destination input by the driver. The navigation device displays a guidance route, which is selected based on the search result, on the display screen. In addition, when the vehicle approaches a junction where guidance on right turn or left turn is necessary (hereinafter called a guidance junction), the navigation device gives a guidance via voice or a display screen to guide the user to a desired destination. Recently, some of the mobile phones, smartphones, Personal Digital Assistants (PDA), and personal computers have a function similar to that of the navigation device described above. In addition, the guidance described above may be given not only to a vehicle but also to a pedestrian or a bicycle.

When a vehicle approaches a guidance junction where guidance such as a right or left turn instruction is given, it is important to give such guidance with right timing. Giving guidance with right timing requires the accurate detection of the vehicle's current position. The accurate detection of the current position of a vehicle is important not only for giving guidance on a guidance junction but also for controlling the vehicle (for example, decelerating the vehicle) when the vehicle approaches a junction.

One of the conventionally known methods for detecting the vehicle's current position is a dead reckoning navigation that relatively detects the vehicle's current position using the information (dead reckoning navigation information) obtained from a distance sensor or an angle sensor mounted in the vehicle. However, the method for relatively identifying the vehicle's position from the dead reckoning navigation information used in a dead reckoning navigation cannot accurately detect the vehicle's current position when the vehicle travels on a road with a special shape such as a curved road or a rotary. To solve this problem, Japanese Patent No. 4651511 proposes a technology for accurately detecting the vehicle's current position by detecting the turning angular amount relative to the base point of the rotary when the vehicle passes through a rotary.

SUMMARY OF INVENTION

The technology described in Japanese Patent No. 4651511 still has the problem that the vehicle's current position cannot be accurately detected in the cases described below.

The dead reckoning navigation identifies the detected current position of a vehicle on a road so that the detected vehicle position does not deviate from the road. That is, the vehicle's current position is detected on the assumption that a vehicle moves along a link included in the map information. However, because a traveling path along which a vehicle actually travels does not necessarily match the shape of a link included in the map information, the actual vehicle's position sometimes does not match the detected position.

Figure 7:
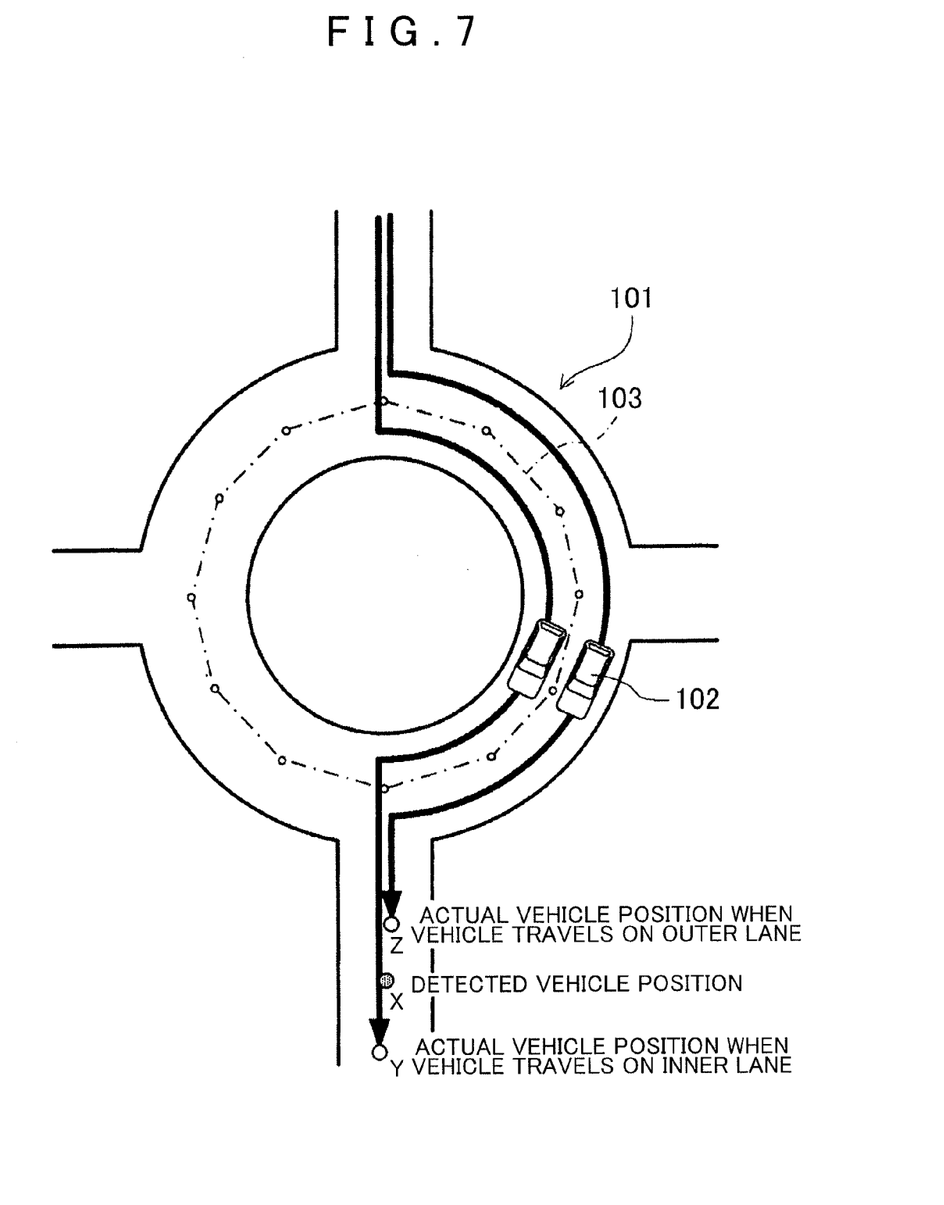
FIG. 7 is a diagram showing the problems with the related art.

For example, when a vehicle 102 travels in a rotary 101 composed of a two-lane road as shown in FIG. 7, the travel distance of the vehicle 102 depends largely on which lane, inner or outer, the vehicle 102 travels on. As described above, the dead reckoning navigation detects the vehicle position based on the estimation that the vehicle 102 travels along the link. Therefore, when a link 103 of the rotary 101 coincides with the boundary between the lanes as shown in FIG. 7, the distance of the traveling path, along which the vehicle 102 in the inner lane actually travels in the rotary 101, is shorter than the length of the target link 103. This means that, when the vehicle 102 exits the rotary 101, the position X of the vehicle 102 detected by the dead reckoning navigation is behind the actual position Y. That is, there is a difference between the actual position of the vehicle 102 and the detection position. On the other hand, the distance of the traveling path, along which the vehicle 102 in the outer lane actually travels in the rotary 101, is longer than the length of the target link 103. This means that, when the vehicle 102 exits the rotary 101, the position X of the vehicle 102 detected by the dead reckoning navigation is ahead of the actual position Z. That is, there is a difference between the actual position of the vehicle 102 and the detection position.

The present invention provides a moving body position detection system, a moving body position detection apparatus, a moving body position detection method, and a computer-readable storage medium that can accurately detect the position of a moving body when the position of the moving body is detected based on the dead reckoning navigation information.

A first aspect of the invention is a moving body position detection system including: a dead reckoning navigation information acquisition unit that acquires dead reckoning navigation information on a moving body; a position identification unit that identifies a position of the moving body on a link based on the dead reckoning navigation information on the moving body; a link data acquisition unit that acquires current position link data on a current position link and neighboring link data on a neighboring link, the current position link being a link on which the position of the moving body identified by the position identification unit is located, the neighboring link connected to the current position link; a comparison unit that compares the dead reckoning navigation information on the moving body with the current position link data and with the neighboring link data; and a position update unit that updates the position of the moving body, identified by the position identification unit, based on a comparison result of the comparison unit.

A second aspect of the invention is a moving body position detection apparatus including: a dead reckoning navigation information acquisition unit that acquires dead reckoning navigation information on a moving body; a position identification unit that identifies a position of the moving body on a link based on the dead reckoning navigation information on the moving body; a link data acquisition unit that acquires current position link data on a current position link and neighboring link data on a neighboring link, the current position link being a link on which the position of the moving body identified by the position identification unit is located, the neighboring link connected to the current position link; a comparison unit that compares the dead reckoning navigation information on the moving body with the current position link data and with the neighboring link data; and a position update unit that updates the position of the moving body, identified by the position identification unit, based on a comparison result of the comparison unit.

A third aspect of the invention is a moving body position detection method including: acquiring dead reckoning navigation information on a moving body; identifying a position of the moving body on a link based on the dead reckoning navigation information on the moving body; acquiring current position link data on a current position link and neighboring link data on a neighboring link, the current position link being a link on which the identified position of the moving body is located, the neighboring link connected to the current position link; comparing the dead reckoning navigation information on the moving body with the current position link data and with the neighboring link data; and updating the identified position of the moving body based on a comparison result of comparing the dead reckoning navigation information on the moving body with the current position link data and with the neighboring link data.

A fourth aspect of the invention is a non-transitory computer-readable storage medium that stores computer-executable instructions for performing a moving body position detection function including: acquiring dead reckoning navigation information on a moving body; identifying a position of the moving body on a link based on the dead reckoning navigation information on the moving body; acquiring current position link data on a current position link and neighboring link data on a neighboring link, the current position link being a link on which the identified position of the moving body is located, the neighboring link connected to the current position link; comparing the dead reckoning navigation information on the moving body with the current position link data and with the neighboring link data; and updating the identified position of the moving body based on a comparison result of comparing the dead reckoning navigation information on the moving body with the current position link data and with the neighboring link data.

According to the configurations described above, the dead reckoning navigation information on a moving body is compared with the link data on the current position link and with link data on the neighboring links to update the position of the moving body. Therefore, when the moving body's position is detected based on the dead reckoning navigation information, the moving body's position can be detected accurately.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
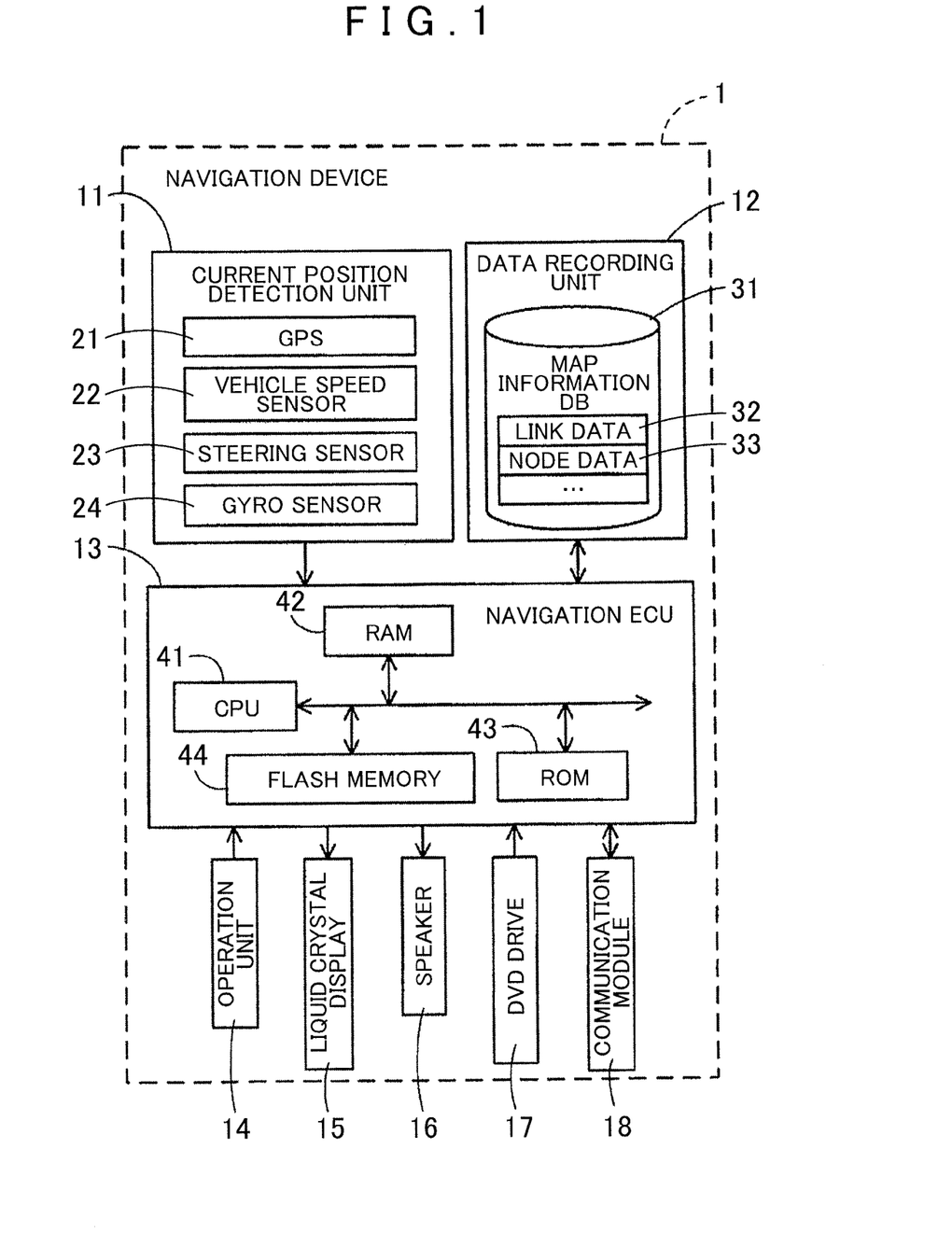
FIG. 1 is a block diagram showing a navigation device in an embodiment.

A moving body position detection system and a moving body position detection apparatus according to the present invention will be described in detail below with reference to the drawings based on one embodiment in which the moving body position detection system and the moving body position detection apparatus are embodied as a navigation device. First, the following describes the general configuration of a navigation device 1 in this embodiment with reference to FIG. 1. FIG. 1 is a block diagram showing a navigation device 1 in this embodiment.

As shown in FIG. 1, the navigation device 1 in this embodiment includes the following: a current position detection unit 11 that detects the current position of a vehicle in which the navigation device 1 is mounted, a data recording unit 12 in which various types of data is recorded, a navigation electronic control unit (ECU) 13 that performs various types of operation processing based on received information, an operation unit 14 that accepts an operation from the user, a liquid crystal display 15 that displays to the user a map around a vehicle and facility information about the facilities, a speaker 16 that outputs voice guidance about route guidance, a DVD drive 17 that reads a DVD that is a recording medium, and a communication module 18 that communicates with an information center such as a probe center or the Vehicle Information and Communication System (VICS: registered trademark) center.

The following describes the components of the navigation device 1, one by one. The current position detection unit 11, which includes a GPS 21, a vehicle speed sensor 22, a steering sensor 23, and a gyro sensor 24, is configured to detect the current position, current direction, and traveling speed of the vehicle and the current time of day. The vehicle speed sensor 22, a sensor to detect the traveling distance or vehicle speed, generates a pulse according to the rotation of vehicle's driving wheel and outputs the generated pulse signal to the navigation ECU 13. The navigation ECU 13 counts the generated pulses to calculate the rotation speed of the driving wheel and the traveling distance. The navigation ECU 13 cooperates with the vehicle speed sensor 22, gyro sensor 24, and GPS 21 to accurately generate a dead reckoning navigation path (that is, detects the vehicle's current position) generated based on the dead reckoning navigation information. the dead reckoning navigation, which is the output signal of the vehicle speed sensor 22 or gyro sensor 24; indicates the traveling distance information or the direction information on the vehicle. Note that the navigation device 1 need not have all of the four types of sensors described above but may have only one or more of them.

The data recording unit 12 includes two components: a hard disk and a recording head (both not shown). The hard disk serves as an external storage device and a recording medium. The recording head reads a map information DB 31 and a predetermined program from the hard disk and, at the same time, writes predetermined data on the hard disk. The data recording unit 12 may be configured not by a hard disk but by a memory card or by an optical disc such as a CD or a DVD.

The map information DB 31 is a storage unit that stores link data 32 on the roads (links), node data 33 on the nodes, junction data on the junctions, facility data on the facilities, map display data for displaying a map, search data for searching for a route, and find data for finding a location.

The link data 32 includes a link ID that identifies a link, end node information that identifies a node located at the end of a link, a road type (link type) of a road configuring a link, a road attribute (link attribute) of a road configuring a link, a link direction, and position coordinates of a shape interpolation point for identifying the shape of a link between nodes (for example, curve shape of a curved road). The link type includes information that identifies the type of a road such as an open road, a toll road, and an expressway. The link attribute includes the information that identifies whether a road forms a rotary (roundabout), the number of lanes, and the information that identifies whether the road is a one-way road or a two-way road. The node data 33 includes a node ID that identifies a node, the position coordinates of a node, and connection destination node information that identifies a connection destination node to which a node is connected via a link.

On the other hand, the navigation ECU 13 is an electronic control unit that controls the navigation device 1 in its entirety. The navigation ECU 13 includes a CPU 41, which serves as both an operation device and a control device, and internal storage devices such as a RAM 42, a ROM 43, and a flash memory 44. The RAM 42 is used as a working memory when the CPU 41 performs various types of operation processing and, in addition, stores route data when a route is searched for. The ROM 43 stores the control program and the vehicle position detection processing program (see FIGS. 2A and 2B) described later. The flash memory 44 stores a program read from the ROM 43. The navigation ECU 13 configures various units each of which functions as the processing algorithm. For example, the dead reckoning navigation information acquisition unit is configured to acquire dead reckoning navigation information on a vehicle (moving body) (for example, travel distance information or direction information on a vehicle). The position identification unit is configured to identify the position of a vehicle on a link based on the dead reckoning navigation information on the vehicle. The link data acquisition unit is configured to acquire current position link data on a link (current position link) on which the identified position of the vehicle is located and neighboring link data on a neighboring link connected to the current position link. The comparison unit is configured to compare the dead reckoning navigation information on a vehicle with the current position link data and with the neighboring link data. The position update unit is configured to update the position of a moving body, identified by the position identification unit, based on the comparison result of the comparison unit. The target position setting unit is configured to set a corrected target position, which will be described later, based on the comparison result of the comparison unit.

The operation unit 14, which is operated by the user to enter a starting point as the travel start point and a destination as the travel termination point, includes multiple operation switches (not shown) such as various keys and buttons. The navigation ECU 13 performs the control operation in response to a switch signal, which is output by pressing an operation switch, to execute various operations corresponding to the switch signal. The operation unit 14 may be configured by a touch panel provided on the front of the liquid crystal display 15. The operation unit 14 may also be configured by a microphone and a voice recognition device.

The liquid crystal display 15 displays a map image including the roads, traffic information, operation guide, operation menu, key guide, recommended route from the start point to the destination, guidance information on a road along a recommended route, news, weather forecast, time of day, mail, and TV programs. When a map image is displayed, the liquid crystal display 15 displays the current position mark indicating the vehicle's current position identified by the vehicle position detection processing program (see FIGS. 2A and 2B) described later.

The speaker 16 outputs voice guidance that guides the driver along a recommended route or outputs traffic guidance information in response to an instruction from the navigation ECU 13.

The DVD drive 17 is a drive capable of reading data from a recording medium such as a DVD or a CD. Based on the data that is read, the DVD drive 17 plays music or video or updates the map information DB 31.

The communication module 18 is a communication device that receives traffic information sent from a traffic information center such as the VICS center or the probe center. For example, a mobile phone or a DCM is used as the communication device. The traffic information includes traffic jam information, traffic regulation information, and traffic accident information.

Figure 2A:
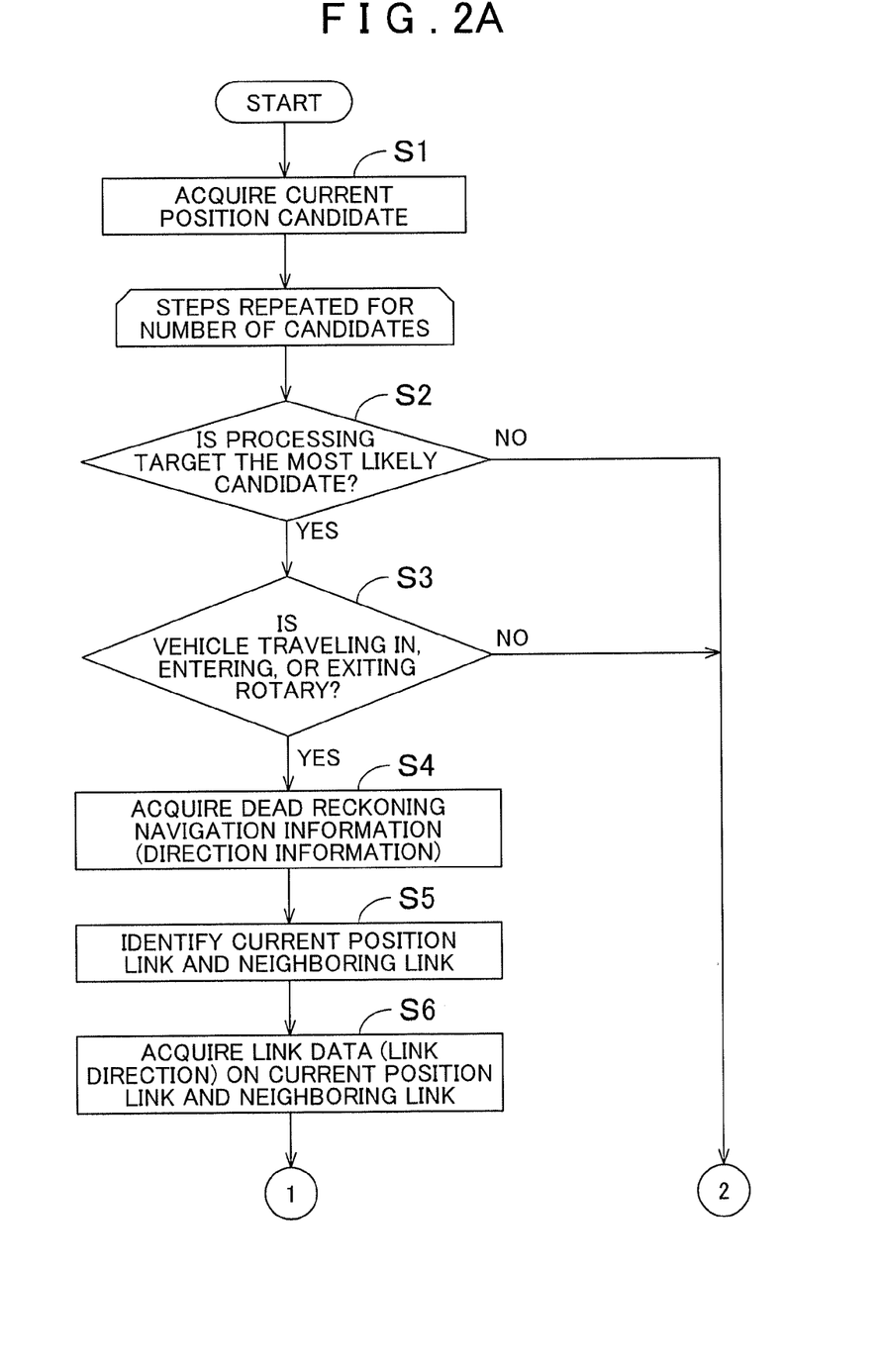
FIGS. 2A and 2B are flowcharts showing a vehicle position detection processing program in the embodiment.
Figure 2B:
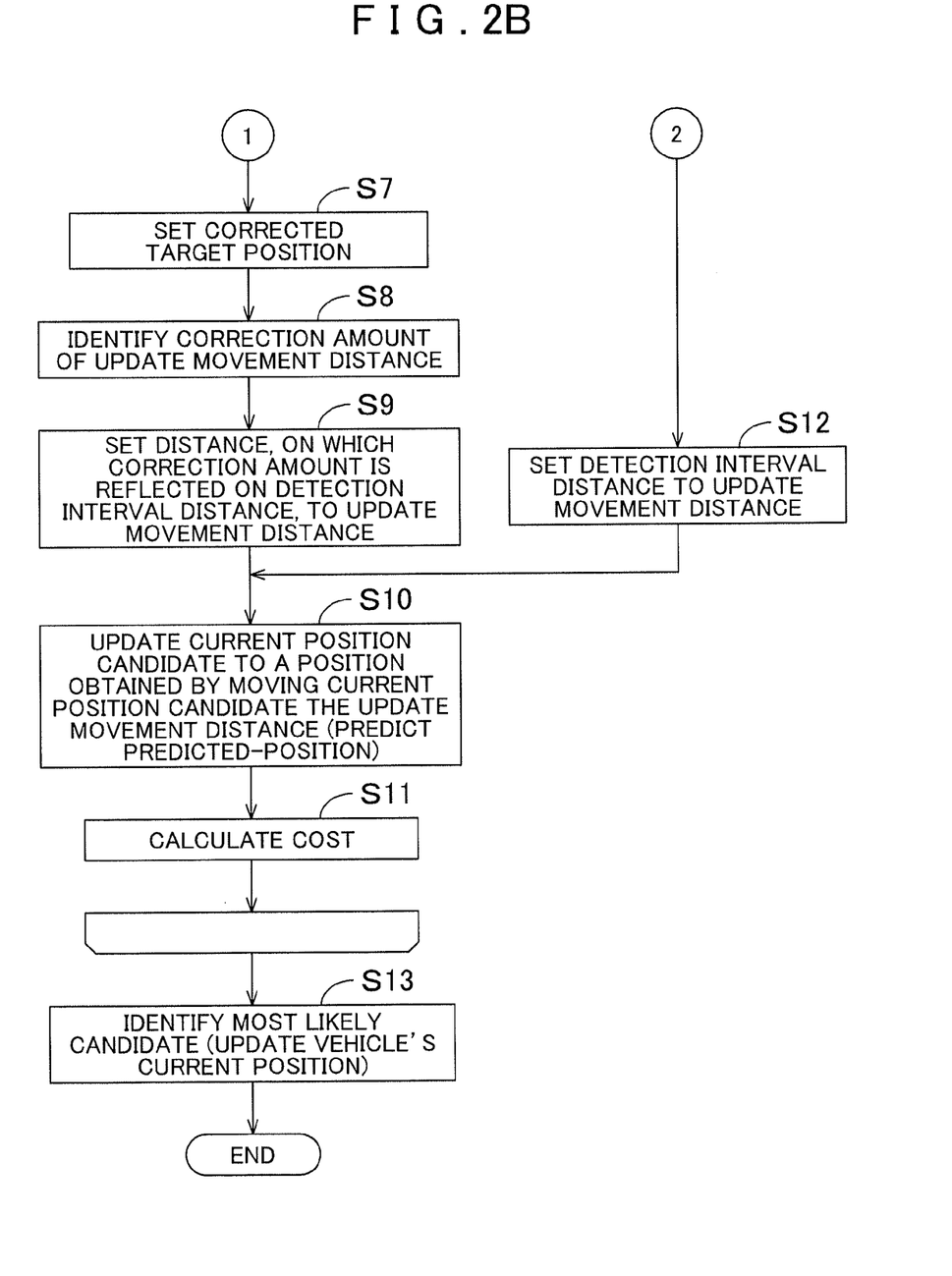

Next, with reference to FIGS. 2A and 2B, the following describes the vehicle position detection processing program executed by the navigation ECU 13 in the navigation device 1 that is configured as described above. FIGS. 2A and 2B are flowcharts showing the processing of the vehicle position detection processing program in this embodiment. The vehicle position detection processing program, a program that detects the vehicle's current position based on the dead reckoning navigation, is executed repeatedly at a predetermined interval (at a periodic interval at which the vehicle's current position is detected, i.e., each time the vehicle travels a predetermined detection interval distance (for example, 6 m)) after the ACC of the vehicle is turned on. The program shown in the flowchart in FIGS. 2A and 2B below is stored in the RAM 42 or ROM 43, included in the navigation device 1, for execution by the CPU 41.

The vehicle position detection processing program operates as follows. First, in step 1 (hereinafter, step is abbreviated S), the CPU 41 acquires a current position candidate that is a candidate for the vehicle's current position. The current position candidate is composed of one or more candidates. When the current position candidate is composed of multiple candidates, the candidate, which is one of the multiple candidates and is considered the most likely current position candidate based on the cost calculation described later, is identified as the most likely candidate. In contrast, when the current position candidate is composed of only one candidate, the only one candidate is identified as the most likely candidate. After that, on the assumption that the vehicle is located at the position corresponding to the most likely candidate, other processing (vehicle's current position display control, junction guidance control, vehicle speed reduction control, and so on) that uses the vehicle's current position is executed. That is, it is detected that the vehicle is located at the position corresponding to the most likely candidate.

The subsequent processing, S2 to S12, is executed for each current position candidate acquired in S1. After processing S2-S12 is performed for all current position candidates, the processing proceeds to S13.

In step S2, the CPU 41 determines whether the processing-target current position candidate is the most likely candidate.

If the processing-target current position candidate is the most likely candidate (S2: YES), the processing proceeds to S3. Conversely, if the processing-target current position candidate is not the most likely candidate (S2: NO), the processing proceeds to S12.

Figure 3:
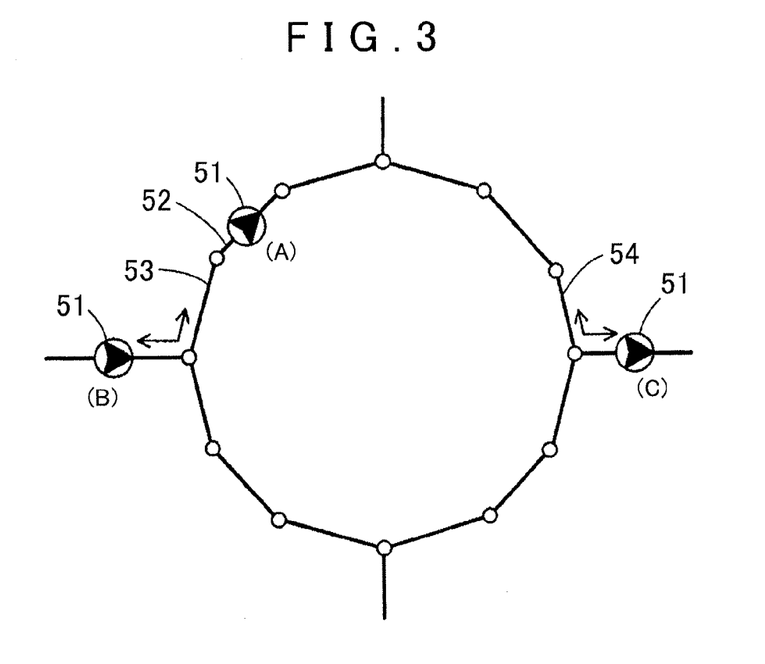
FIG. 3 is a diagram showing the state in which a vehicle is traveling in a rotary, the state in which a vehicle is going to enter the rotary, and the state in which a vehicle is exiting the rotary.

Next, in step S3, the CPU 41 determines whether the vehicle is in one of the following states, (A) to (C).
(A) State in which the vehicle is moving in a rotary
(B) State in which the vehicle is entering a rotary
(C) State in which the vehicle is exiting a rotary More specifically, the CPU 41 performs the following processing to determine whether the vehicle is in one of the states, (A) to (C). First, the CPU 41 identifies a link in which the processing-target current position candidate is located (hereinafter, this link called a current position link). Next, the CPU 41 acquires the link attribute of the current position link from the link data 32 stored in the data recording unit 12. When a current position link 52, in which a processing-target current position candidate 51 is located, is a link configuring a rotary as shown in FIG. 3, it is determined that the vehicle is in "(A) state in which the vehicle is moving in a rotary". When the current position link 52 is not a link configuring the rotary but when there is a link 53, which configures the rotary, within a predetermined distance (for example, within 12 m) from the processing-target current position candidate 51 in the forward direction of the traveling direction as shown in FIG. 3, it is determined that the vehicle is in "(B) State in which the vehicle is entering a rotary". When the current position link 52 is not a link configuring the rotary but when there is a link 54, which configures the rotary, within a predetermined distance (for example, within 18 m) from the processing-target current position candidate 51 in the backward direction of the traveling direction as shown in FIG. 3, it is determined that the vehicle is in "(C) State in which the vehicle is exiting a rotary."

If the vehicle is in one of the states, (A)-(C), described above (S3: YES), the processing proceeds to S4. Conversely, if the vehicle is not in any of the states (A)-(C) (S3: NO), the processing proceeds to S12.

In S4, the CPU 41 acquires the detection signal of the gyro sensor 24 (that is, direction information on the current vehicle) as the dead reckoning navigation information.

Next, in S5, the CPU 41 identifies the current position link, on which the processing-target current position candidate is located, and the links connected to the current position link (hereinafter called a neighboring link). The neighboring link includes not only the link, connected to the current position link in the forward direction of the traveling direction of the vehicle, but also a link connected to the current position link in a non-forward direction (for example, in the backward direction) of the vehicle's traveling direction. If multiple links are connected to the current position link, the CPU 41 identifies the multiple links each as the neighboring link.

Next, in S6, the CPU 41 acquires the link direction of the current position link and the link direction of the neighboring link, both of which are identified in S5, respectively from the link data 32 stored in the data recording unit 12.

After that, in S7, the CPU 41 compares vehicle's current direction, acquired in S4, with the link direction of the current position link and with the link direction of the neighboring link (both link directions are those acquired in S6) and, based on the comparison result, sets a corrected target position. The corrected target position is a position where the vehicle is predicted to be actually located now. The corrected target position is a target position that is used when the processing-target current position candidate is updated. That is, the CPU 41 updates the current position candidate so that the difference between the processing-target current position candidate and the corrected target position is reduced, as will be described later.

Figure 4:
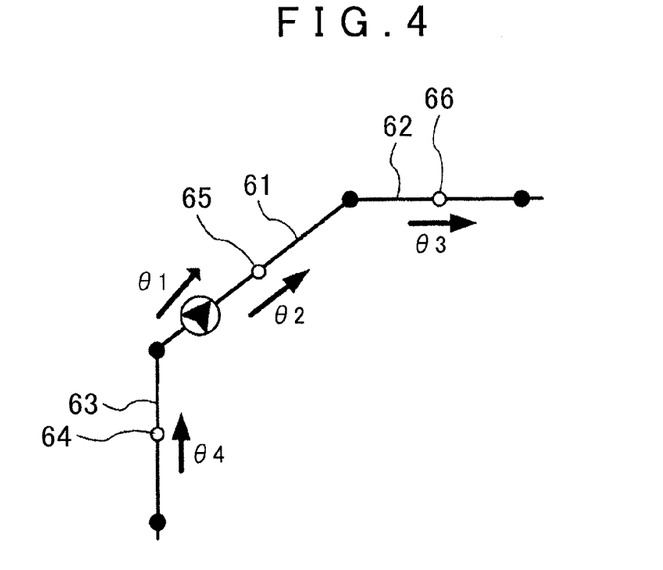
FIG. 4 is a diagram showing the corrected target position setting method.

The following describes in detail the processing for setting a corrected target position, described in S7, with reference to FIG. 4. In the example shown in FIG. 4, the two neighboring links are connected to a current position link 61: one is a neighboring link 62 connected in the forward direction of the vehicle's traveling direction (hereinafter called a forward neighboring link) and the other is a neighboring link 63 connected in the backward direction of the vehicle's traveling direction (hereinafter called a backward neighboring link). First, the CPU 41 compares the current vehicle's direction θ1 with the link direction θ2 of the current position link, with the link direction θ3 of the forward neighboring link 62, and with the link direction θ4 of the backward neighboring link 63, respectively. After that, the CPU 41 performs one of the following processing (1) to (5) based on the comparison result.

(1) When θ1≤θ4
Set the midpoint 64 of the backward neighboring link 63 to the corrected target position.
(2) When θ4<θ1<θ2
Set the point, obtained by internally dividing the link segment extending from the midpoint 64 of the backward neighboring link 63 to the midpoint 65 of the current position link 61 in the ratio of (θ1−θ4):(θ2−θ1), to the corrected target position.
(3) When θ1=θ2
Set the midpoint 65 of the current position link 61 to the corrected target position.
(4) When θ2<θ1<θ3
Set the point, obtained by internally dividing the link segment extending from the midpoint 65 of the current position link 61 to the midpoint 66 of the forward neighboring link 62 in the ratio of (θ1−θ2):(θ3−θ1), to the corrected target position.
(5) When θ3≤θ1
Set the midpoint 66 of the forward neighboring link 62 to the corrected target position.

Next, in S8, the CPU 41 identifies the correction amount of the update movement distance based on the corrected target position that is set in S7. The update movement distance refers to the distance from the position of the processing-target current position candidate before the update to the position of the processing-target current position candidate after the update (that is, the distance over which the position of the processing-target current position candidate is moved when the processing-target current position candidate is updated).

Figure 5:
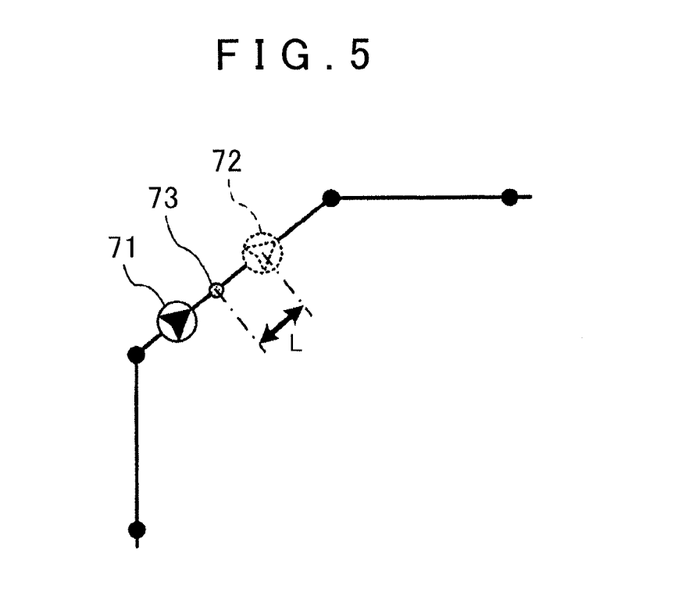
FIG. 5 is a diagram showing the update processing of a current position candidate performed based on a corrected target position.
Figure 6:
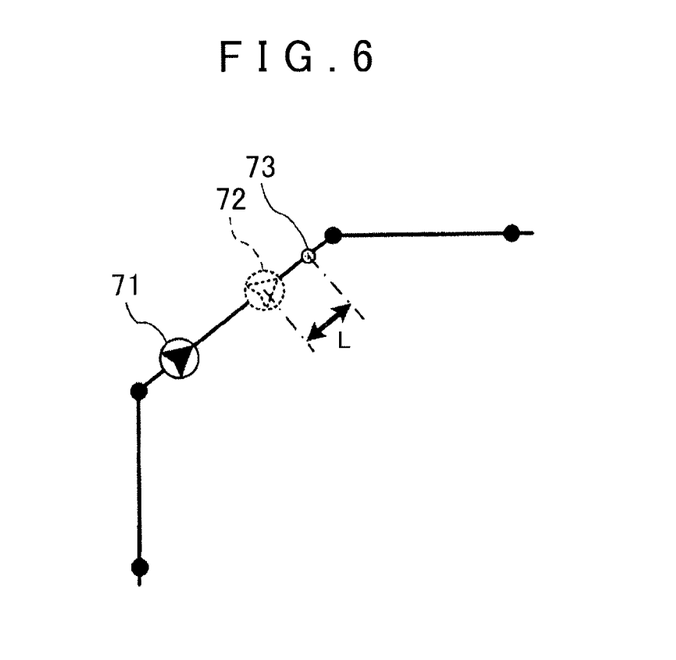
FIG. 6 is a diagram showing the update processing of a current position candidate performed based on a corrected target position.

The following describes in detail the processing for identifying the correction amount of the update movement distance in S8 with reference to FIG. 5 and FIG. 6. As shown in FIG. 5 and FIG. 6, the CPU 41 identifies the position 72 (hereinafter, this position is called a temporary update position) to which a processing-target current position candidate 71 is moved a detection interval distance (for example, 6 m) in the forward direction of the traveling direction. Note that this detection distance interval is the travel distance interval of a vehicle and that the vehicle position detection processing program is executed each time the vehicle travels the travel distance interval. When a corrected target position 73 is located behind the temporary update position 72 in the traveling direction as shown in FIG. 5, the correction amount of the update movement distance is negative. That is, the distance over which the position of the processing-target current position candidate 71 is moved during the update is made shorter than the usual distance (detection interval distance). The negative correction amount is determined based on the distance L between the temporary update position 72 and the corrected target position 73. The larger the distance L is, the larger the negative correction amount is. On the other hand, when the corrected target position 73 is located ahead of the temporary update position 72 in the traveling direction as shown in FIG. 6, the correction amount of the update movement distance is positive. That is, the distance over which the position of the processing-target current position candidate 71 is moved during the update is made longer than the usual distance (detection interval distance). The positive correction amount is determined based on the distance L between the temporary update position 72 and the corrected target position 73. The larger the distance L is, the larger the positive correction amount is.

Next, in S9, the CPU 41 sets the update movement distance on which the correction amount of the update movement distance, identified in S8, is reflected. Here, the update movement distance refers to a value obtained by adding or subtracting the correction amount, identified in S8, to or from the base distance. The base distance may be the detection interval distance (for example, 6 m). For example, when the detection interval distance is 6 m and the correction amount identified in S8 is −2 m, the update movement distance becomes 4 m. When the detection interval distance is 6 m and the correction amount identified in S8 is 0 m, the update movement distance becomes 6 m. When the detection interval distance is 6 m and the correction amount identified in S8 is +1 m, the update movement distance becomes 7 m. Therefore, when the corrected target position, which is set in S7, is located ahead of the temporary update position in the forward direction, the position of the current position candidate is updated to a position ahead of the temporary update position in the forward direction of the traveling direction. Conversely, when the corrected target position is located behind the temporary update position in the traveling direction, the position of the current position candidate is updated to a position behind the temporary update position in the traveling direction.

Next, in S10, the CPU 41 updates the position of the processing-target current position candidate based on the update movement distance that is set in S9. More specifically, the CPU 41 updates the position of the current position candidate to a position obtained by moving the current position of the processing-target current position candidate the update movement distance in the forward direction of the vehicle's traveling direction along the link. That is, the CPU 41 predicts the predicted position at which the vehicle is to be located after a predetermined interval has elapsed.

After that, in step S11, the CPU 41 performs cost calculation for the processing-target current position candidate based on the position of the processing-target current position candidate before the update, the position of the processing-target current position candidate after the update, and the dead reckoning navigation information. Here, the cost value refers to an index for determining whether the processing-target current position candidate is suitable for the vehicle's current position, and the cost calculation calculates this cost value for the processing-target current position candidate. It is determined that the smaller the cost value calculated by the cost calculation is, the more suitable the current position candidate is for the vehicle's current position (that is, nearer to the actual vehicle position). For example, the cost value is calculated based on the difference between the vehicle's current direction and the direction from the current position candidate before the update to the current position candidate after the update. When there are multiple current position candidates, the current position candidate with the smallest cost value is estimated to be nearest to the actual vehicle's current position and, as will be described later, that current position candidate is identified as the most likely candidate.

On the other hand, in S12, the CPU 41 sets the detection interval distance (for example, 6 m) to the update movement distance. After that, in S10, the CPU 41 updates the position of the processing-target current position candidate based on the update movement distance that is set in S12. In addition, in S11, the CPU 41 performs the cost calculation for the processing-target current position candidate based on the position of the current position candidate updated in S10 as described above.

The CPU 41 performs the processing S2-S12 for all current position candidates acquired in S1, once for each current position candidate. After performing the processing S2-S12 for all current position candidates acquired in S1, the processing proceeds to S13.

In S13, the CPU 41 identifies the updated position of the current position candidate, which is one of the current position candidates acquired in S1 and whose cost value calculated for the updated current position candidate is the smallest, as the most likely candidate. After that, on the assumption that the vehicle is located at the most likely current position candidate, other processing (vehicle's current position display control, junction guidance control, vehicle speed reduction control, and so on) that uses the vehicle's current position is executed thereafter. That is, the new most likely candidate is detected as the vehicle's current position, and the vehicle's current position is updated from the previous most likely candidate.

In the vehicle position detection processing program described above, the position of the vehicle relative to the base position is detected as the vehicle position using the dead reckoning navigation. The base position is updated to a vehicle position, detected not by the dead reckoning navigation based on the GPS 21 and high-accuracy location technology, with right timing (for example, when the ACC is turned on or each time a predetermined interval elapses).

As described above in detail, according to the navigation device 1, the moving body position detection method using the navigation device 1, and the computer program executed in the navigation device 1 in this embodiment, the dead reckoning navigation information on the vehicle is acquired (S4). In addition, the current position link, on which the current position candidate that is a candidate of the vehicle's current position is located, and the neighboring links connected to the current position link (S5) are acquired. Then, the dead reckoning navigation information on the vehicle is compared with the link data on the current position link and with the link data on the neighboring link. Based on the comparison result, the current position candidate is updated to detect the vehicle's current position (S10, S11, S13). Therefore, when the vehicle's position is detected based on the dead reckoning navigation information, the vehicle's position can be detected accurately. In particular, when a vehicle travels in a road with a special shape such as a curved road or a rotary; that is, even when a path, along which the vehicle moves, does not match the shape of a link included in the map information, it is possible to reduce the difference between the actual vehicle's position and the detection position.

Information on the vehicle's direction is acquired as the dead reckoning navigation and, at the same time, the direction of the current position link and the direction of the neighboring link are acquired. Then, the vehicle's direction is compared with the direction of the current position link and with the direction of the neighboring link to update the detection position of the vehicle. Therefore, when the vehicle's position is detected based on the dead reckoning navigation information, the vehicle's position can be detected accurately. In particular, when a vehicle travels in a road such as a curved road or a rotary where the link direction continuously changes; that is, even when a path, along which the vehicle moves, does not match the shape of a link included in the map information, it is possible to reduce the difference between the actual vehicle's position and the detection position.

In addition, based on the dead reckoning navigation information about the vehicle and on the link data on the current position link and the link data on the neighboring links, that is, based on the result of comparing the vehicle's direction with the direction of the current position link and with the direction of the neighboring link, the corrected target position (S7) is set. Then, the vehicle's detection position is updated so that the difference between the position of the current position candidate and the corrected target position becomes smaller (S10). Therefore, the detection error can be corrected so that the detection position becomes nearer to the actual vehicle's position.

When the vehicle's direction, the direction of the current position link, and the direction of a neighboring link satisfy a predetermined first condition, the corrected target position is set at the midpoint of the current position link or at the midpoint of the neighboring link. Therefore, an appropriate corrected target position can be set.

When the vehicle's direction, the direction of the current position link, and the direction of a neighboring link satisfy a predetermined second condition, a first direction angle, which is the difference between the vehicle's direction and the direction of the current position link, and a second direction angle, which is the difference between the vehicle's direction and the direction of the neighboring link, are calculated. After that, the corrected target position is set at a point obtained by internally dividing a link segment extending from the midpoint of the current position link to the midpoint of the neighboring link in the ratio between the first direction angle and the second direction angle. Therefore, an appropriate corrected target position can be set.

The vehicle's detection position is updated each time the vehicle travels a predetermined distance. When the corrected target position is located ahead of the temporary update position in the traveling direction, the vehicle's position is updated to a position ahead of the temporary update position in the traveling direction. On the other hand, when the corrected target position is located behind the temporary update position in the traveling direction, the vehicle's position is updated to a position behind the temporary update position in the traveling direction. Therefore, the detection error can be corrected so that the detection position becomes nearer to the actual vehicle's position.

When the vehicle is moving in a rotary, when the vehicle enters a rotary, or when the vehicle exits a rotary, the dead reckoning navigation information on the vehicle is compared with the link data on the current position link and with the link data on a neighboring link to update the detection position of the vehicle. Therefore, especially when the vehicle travels around a rotary, the position of the vehicle can be detected accurately.

It is to be understood that the present invention is not limited to the embodiment described above and that various changes and modifications may be made without departing from the spirit of the present invention. For example, though the vehicle's direction is compared with the direction of the current position link and with the direction of a neighboring link and, based on the comparison result, the vehicle's detection position is updated in this embodiment, dead reckoning navigation information other than the vehicle's direction may be used and, in addition, link data other than a link direction may be used. For example, the travel distance of a vehicle may be used as the dead reckoning navigation information. In addition, the link data may be the coordinates of a link endpoint, the length of a link, or the type of a link.

Although the configuration is employed in this embodiment in which the update movement distance of a current position candidate is adjusted to reduce the difference between the vehicle's detection position and the corrected target position that is set, another configuration may also be employed. For example, a configuration may be used in which a current position candidate is updated so that the position of the current position candidate coincides with the corrected target position. In addition, a configuration may be used in which not the update movement distance but the update interval is adjusted.

The processing in S4-S11, though executed in this embodiment when the vehicle is moving in a rotary, when the vehicle enters a rotary, or when the vehicle exits a rotary, may be executed under a condition other that the above. For example, the processing in S4 to S11 may be executed when the vehicle travels in a curved road with a curvature equal to or higher than a predetermined value. In addition, the processing in S4 to S11, though executed only for the most likely candidate in this embodiment, may be executed for a current position candidate other than the most likely candidate.

In addition, though the navigation device is configured in this embodiment to execute the vehicle position detection processing program (FIGS. 2A and 2B) and update the detection position of the vehicle each time the vehicle travels a predetermined detection interval distance (for example, 6 m), the detection position of the vehicle may also be updated at other times. For example, the detection position of the vehicle may also be updated each time a predetermined time elapses. In that case, the distance over which the vehicle travels is detected with the use of the vehicle speed sensor 22 at a predetermined time interval, in which case the detected distance is the detected interval distance.

The present invention is applicable not only to a navigation device but also to various types of devices having the function to detect the current position of a moving body such as a vehicle. For example, the present invention is applicable to a portable terminal such as a mobile phone or a smartphone or to a personal computer, a portable music player, and so on (hereinafter these devices are called a portable terminal). The present invention is applicable also to a system composed of a server and portable terminals. In that case, the vehicle position detection processing program (FIG. 2) may be configured to allow each of the steps to be executed by one of the components, either the server or a portable terminal, of the system. The present invention, when applied to a portable terminal, may detect the position of a moving body other than a vehicle, for example, the position of the user of a portable terminal or the vehicle position of as a bicycle.

What is claimed is:

1. A moving body position detection system comprising:
a dead reckoning navigation information acquisition unit that acquires dead reckoning navigation information on a moving body;
a position identification unit that identifies a position of the moving body on a link based on the dead reckoning navigation information on the moving body;
a link data acquisition unit that acquires current position link data on a current position link and neighboring link data on a neighboring link, the current position link being a link on which the position of the moving body identified by the position identification unit is located, the neighboring link connected to the current position link;
a comparison unit that compares the dead reckoning navigation information on the moving body with the current position link data and with the neighboring link data; and
a position update unit that updates the position of the moving body, identified by the position identification unit, based on a comparison result of the comparison unit, wherein:
the dead reckoning navigation information includes information on a direction of the moving body;
the link data acquisition unit acquires a direction of the current position link and a direction of the neighboring link; and
the comparison unit compares the direction of the moving body with the direction of the current position link and with the direction of the neighboring link.

2. The moving body position detection system according to claim 1, wherein:
the dead reckoning navigation information includes information on a direction of the moving body;
the link data acquisition unit acquires a direction of the current position link and a direction of the neighboring link; and
the comparison unit compares the direction of the moving body with the direction of the current position link and with the direction of the neighboring link.

3. The moving body position detection system according to claim 1, wherein:
the position update unit comprises a target position setting unit that sets a corrected target position based on a comparison result of the comparison unit; and
the position update unit updates the position of the moving body so that a difference between the position of the moving body, identified by the position identification unit, and the corrected target position is reduced.

4. The moving body position detection system according to claim 3, wherein, when the direction of the moving body, the direction of the current position link, and the direction of the neighboring link satisfy a predetermined first condition, the target position setting unit sets the corrected target position at the midpoint of the current position link or at the midpoint of the neighboring link.

5. The moving body position detection system according to claim 3, wherein, when the direction of the moving body, the direction of the current position link, and the direction of the neighboring link satisfy a predetermined second condition, the target position setting unit calculates a first direction angle and a second direction angle and sets the corrected target position at a point obtained by internally dividing a link segment extending from the midpoint of the current position link to the midpoint of the neighboring link in a ratio between the first direction angle and the second direction angle, the first direction angle being a difference between the direction of the moving body and the direction of the current position link, the second direction angle being a difference between the direction of the moving body and the direction of the neighboring link.

6. The moving body position detection system according to claim 3, wherein:
the dead reckoning navigation information includes information on a movement distance of the moving body;
the position update unit updates the position of the moving body each time the moving body moves a predetermined distance;
when the corrected target position is located ahead of a temporary update position in a traveling direction, the position update unit updates the position of the moving body to a position ahead of the temporary update position in the traveling direction, the temporary update position being a location the predetermined distance ahead of the position of the moving body before the update; and
when the corrected target position is located behind the temporary update position in the traveling direction, the position update unit updates the position of the moving body to a position behind the temporary update position in the traveling direction.

7. The moving body position detection system according to claim 1, wherein the position update unit updates the position of the moving body, identified by the position identification unit, based on the comparison result of the comparison unit when the moving body is moving in a rotary, when the moving body enters a rotary, or when the moving body exits a rotary.

8. A moving body position detection apparatus comprising:
a dead reckoning navigation information acquisition unit that acquires dead reckoning navigation information on a moving body;
a position identification unit that identifies a position of the moving body on a link based on the dead reckoning navigation information on the moving body;
a link data acquisition unit that acquires current position link data on a current position link and neighboring link data on a neighboring link, the current position link being a link on which the position of the moving body identified by the position identification unit is located, the neighboring link connected to the current position link;
a comparison unit that compares the dead reckoning navigation information on the moving body with the current position link data and with the neighboring link data; and
a position update unit that updates the position of the moving body, identified by the position identification unit, based on a comparison result of the comparison unit, wherein:
the dead reckoning navigation information includes information on a direction of the moving body;
the link data acquisition unit acquires a direction of the current position link and a direction of the neighboring link; and
the comparison unit compares the direction of the moving body with the direction of the current position link and with the direction of the neighboring link.

9. A moving body position detection method comprising:
using a processor to execute:
acquiring dead reckoning navigation information on a moving body;

identifying a position of the moving body on a link based on the dead reckoning navigation information on the moving body;

acquiring current position link data on a current position link and neighboring link data on a neighboring link, the current position link being a link on which the identified position of the moving body is located, the neighboring link connected to the current position link;

comparing the dead reckoning navigation information on the moving body with the current position link data and with the neighboring link data; and updating the identified position of the moving body based on a comparison result of comparing the dead reckoning navigation information on the moving body with the current position link data and with the neighboring link data, wherein:

the dead reckoning navigation information includes information on a direction of the moving body;

the acquiring current position link data includes acquiring a direction of the current position link and a direction of the neighboring link; and the comparing comprises comparing the direction of the moving body with the direction of the current position link and with the direction of the neighboring link.

10. A non-transitory computer-readable storage medium that stores computer-executable instructions for performing a moving body position detection function comprising:

acquiring dead reckoning navigation information on a moving body;

identifying a position of the moving body on a link based on the dead reckoning navigation information on the moving body;

acquiring current position link data on a current position link and neighboring link data on a neighboring link, the current position link being a link on which the identified position of the moving body is located, the neighboring link connected to the current position link;

comparing the dead reckoning navigation information on the moving body with the current position link data and with the neighboring link data; and updating the identified position of the moving body based on a comparison result of comparing the dead reckoning navigation information on the moving body with the current position link data and with the neighboring link data, wherein:

the dead reckoning navigation information includes information on a direction of the moving body;

the acquiring current position link data includes acquiring a direction of the current position link and a direction of the neighboring link; and the comparing comprises comparing the direction of the moving body with the direction of the current position link and with the direction of the neighboring link.

\* \* \* \* \*